United States Patent

Szereday et al.

[11] Patent Number: 5,560,826
[45] Date of Patent: Oct. 1, 1996

[54] DEVICE FOR SEPARATING SUPERNATANT, IN PARTICULAR LIQUID POLLUTANT, E.G. OIL AND THE LIQUID, E.G. WATER

[76] Inventors: Pal Szereday, Agardi ut 16, H-1126 Budapest; Ferenc Toth, Nagy Gyori Istvan koz 6, H-1201 Budapest, both of Hungary

[21] Appl. No.: 306,995

[22] Filed: Sep. 16, 1994

Related U.S. Application Data

[63] Continuation-in-part of PCT/HU93/00015, Mar. 17, 1993.

[30] Foreign Application Priority Data

Mar. 18, 1992 [HU] Hungary .................. P9200892

[51] Int. Cl.⁶ .................................................. C02F 1/40
[52] U.S. Cl. .................. 210/522; 210/532.1; 210/540
[58] Field of Search ...................... 210/521, 522, 210/532.1, 538, 540, 255, 261

[56] References Cited

U.S. PATENT DOCUMENTS

| | | | |
|---|---|---|---|
| 745,519 | 12/1903 | Pravicha et al. | 210/521 |
| 925,834 | 6/1909 | Peck | 210/540 |
| 995,521 | 6/1911 | Buhr | 210/540 |
| 1,032,458 | 7/1912 | White | 210/540 |
| 3,933,654 | 1/1976 | Middelbeek | 210/521 |
| 4,132,645 | 1/1979 | Bottomley et al. | 210/540 |
| 4,422,931 | 12/1983 | Wolde-Michael | 210/540 |
| 4,938,878 | 7/1990 | Hall | 210/255 |
| 4,980,070 | 12/1990 | Lieberman | 210/522 |
| 5,236,585 | 8/1993 | Fink | 210/538 |
| 5,348,648 | 9/1994 | Hamdan | 210/540 |

*Primary Examiner*—Christopher Upton
*Attorney, Agent, or Firm*—Michael N. Meller

[57] ABSTRACT

An apparatus for separating supernatant pollutant, such as oil, from a liquid, such as water is disclosed. The apparatus comprises a receiving tank and a separating tank. The receiving tank has a wall dividing the tank into a first vessel receiving the liquid mixture and having a self-adjusting weir, and a second vessel. The separating tank has a first receptacle separated from the first vessel by a partition along which the self-adjusting weir is located, and a second receptacle connected to the first receptacle. The first receptacle has an outlet for draining the supernatant, while the second receptacle and second vessel have outlets for draining the cleaned liquid.

7 Claims, 1 Drawing Sheet

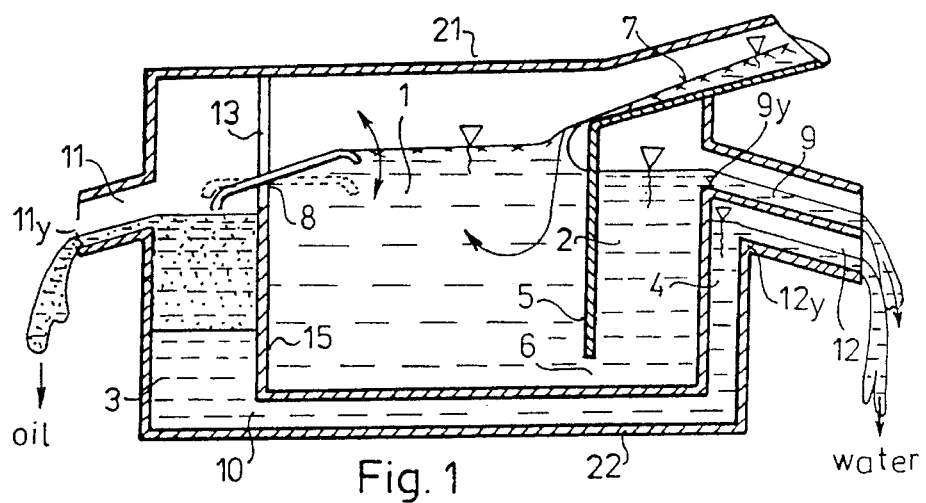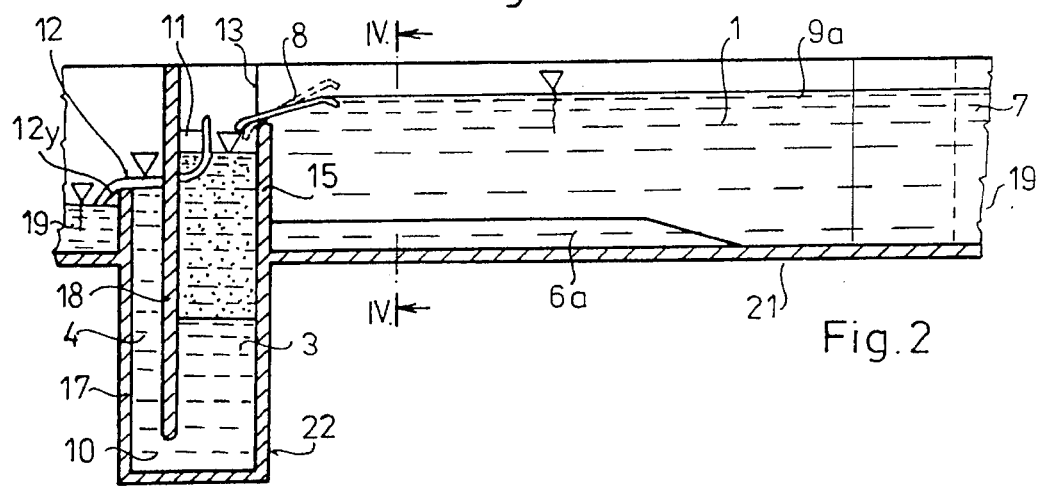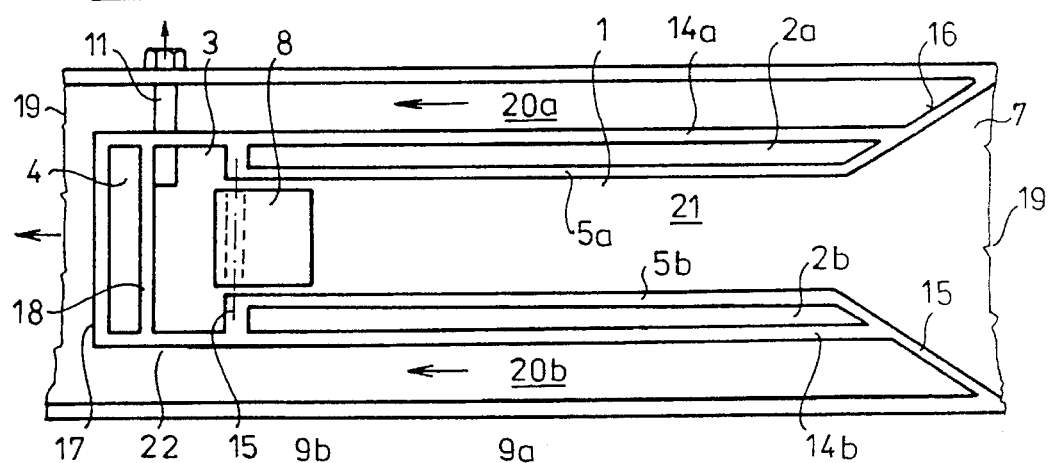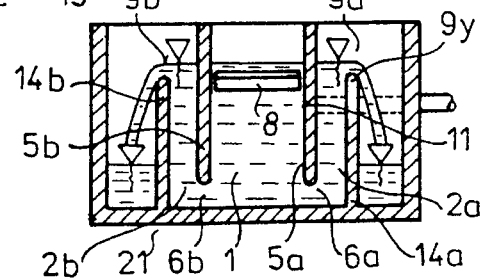

DEVICE FOR SEPARATING SUPERNATANT, IN PARTICULAR LIQUID POLLUTANT, E.G. OIL AND THE LIQUID, E.G. WATER

This application is a continuation-in-part of PCT/HU93/00015 filed Mar. 17, 1993.

The object of the invention is a device for separating supernatant, in particular liquid pollutant, e.g. oil and the liquid, e.g. water, comprising a receiving tank and a separating tank, said receiving tank being suitably built together with said separating tank, said separating tank being divided into a liquid pollutant chamber and a clean liquid chamber, while said receiving tank being divided into a polluted liquid space and a clean liquid space, said clean liquid space and said polluted liquid space being detached from each other but as communicating vessels being still in connection, likewise said clean liquid chamber and said liquid pollutant chamber being detached from each other but as communicating vessels being still in connection, said clean liquid space, said clean liquid chamber and said liquid pollutant chamber being provided with overflow holes, while said polluted liquid space being provided with an overflow hole and an inflow gate, too.

Polluted liquids, e.g. waste waters with oil and fat contents occur in many fields of the industry. In the petroleum refining during the crude oil production, transportation and processing, in the steel and metal industry among others in the rolling mills, during the power production in the power stations, furthermore in the chemical plants, in the machine manufacture, at the petrol stations and in many other fields there are oil waste waters of different contamination.

The purpose of cleansing water polluted by oil is to protect the environment, for these waste waters are dangerous for the limpidity of the waters, and for the nature. Owing to their great migration ability and long decomposition rate they are infective to the soil, getting into the groundwater.

Another purpose of the cleansing is to recover the pollutants for recycling or in a given case to neutralize them, moreover to recuperate the expensively produced and clarified water.

A number of methods and devices are known to clarify polluted waters. Their common feature is that they generally operate upon the principle of the different specific weights of the water and the pollutant. The pollutant in the water is first floated onto the top then the surface layer is removed either by a weir or by a device working on the principle of the adhesion.

The devices of longitudinal through-flow, the oil catchers of tangential input and the shallow settling pools with discs, pipes or bundles of tubes are widely spread.

A common imperfection of the above methods and devices is, that after separating the pollutant the oil has a relatively great water content what makes the transportation, the recuperation or the neutralization expensive. It is unfavorable, too, that the known devices are unable to receive extremely fluctuating amounts, e.g. a quantity of precipitation caused by a summer shower. For this reason there is generally a separate drainage system for the rainwater, however, this way the surface contaminations are inevitably washed into the surface waters or groundwater.

Another common imperfection of the known devices is, that they need an energy consuming heating for the operation supposing that the point of solidification is higher than the outer temperature.

A further imperfection is, that the supernatant pollutant often comprises solid, lumpy pollutant, too, e.g. tree leaves, which can cause the blocking up of the device.

The flotation devices, in which the oil droplets come onto the surface together with gas bubbles which are finely distributed in the liquid, need smaller area and shorter cleansing time, however they cannot eliminate all the other imperfections of the known clarifiers. The operation reliability could only be increased by continuous supervision or automatization, any of these causing additional charges and further sources of error.

The Swiss clarifying devices called "aquasant" are working upon the principle of adsorption. The polluted liquid is forced to flow through a medium operating like a filter in a closed space.

The English clarifier named "HYDE" is of similar structure, the separation of the oil and the water is based here on the different permeability against the different materials in the porous medium. As the filtering medium gets blocked up from time to time the device often needs cleaning, the filters have to be changed, besides, greater volumes of polluted water cannot be cleaned by these devices.

The device "CYCLONET" can be classified as a clarifier of tangential inlet. The polluted water is led first into a prefilter, then into a hydrocyclon. As an effect of the rotation the lighter oil is collected in the middle and from there can be e.g. by pumping easily removed. The imperfection of the method is, that there is no sharp border between the oil and the water and so the separation cannot be perfectly realized.

For skimming supernatant pollutant is the device with the name "NENUFAR" employed. The polluted water spills into a tank floating on the water, from there it is pumped into a chamber of a tank which has there chambers. The oil, which is floating upside in the chamber, spills into the second chamber, while the clear water flows through into the third chamber under a submerging wall. The solution is not perfect, because in case of extreme volume of polluted water the liquids can be mixed with each other, that means that the oil can be contaminated with water and vice versa. In the Hungarian patent description 181 642 a floating tank is disclosed, which has a downstream first increasing then decreasing submersion depth. The tank has an open front end facing the direction of water flow, while all other sides are closed with walls. Under the tank, due to its shape, the flowing velocity is increased and so the water level is sinked. The polluted water, collected inside the tank with sinked water level is then separated with help of deflecting plates, that suitably adjusted make the oil and the water flow with different velocities into different directions. The imperfection of the device is, that encountering a denser pollutant or solid contamination it does not work reliably, it gets blocked and has to be cleaned.

The subject of the invention is to develop a device that removes the floating liquid pollutants from the surface of the liquid forced through the device, especially removes the oil from the surface of water, and wherein the device operates reliably, without any supervision, independent of either the rate of water flow or the proportion of the pollutant, e.g. oil and can be well used in case of solidificated pollutant or floating solid contamination, too. It is also a requirement that the device can operate self-controlled, automatically, but without any machinery so that the separated oil comprises no water, and the cleaned water comprises no oil. The quality of the clarification would not be deteriorated even in case of extreme water or oil quantities.

The fundamental idea of the invention is based on the conception that if a space is divided as communicating vessel into two half-spaces, the liquid level in the half-space containing the supernatant liquid pollutant—according to the known laws of the differences between the specific weights and the communicating vessels—is higher than in the half-space with the clean liquid. In case of a given height and layer-thickness of the liquid pollutant the height difference can be computed, if we know the specific weights. When the half-spaces are provided with overflow holes, the levels of which are determined in different heights according to the above laws, that means higher in the half-space containing the polluted liquid, the pollutant leaves the liquid flowing through the device through the higher, while the clean liquid through the lower overflow hole.

According to another conception there is another condition of the perfect operation and this is to let a liquid of practically constant quantity the device which can be achieved by letting the polluted liquid first to an equalizing tank built principally similar to the previous one, from where the extra liquid is abstracted, and to conduct only the rest of constant volume, skimmed by self-adjusting surface weir to that separating space.

According to the subject the device according to the invention for separating supernatant, in particular liquid pollutant, e.g. oil and the liquid, e.g. water,—comprising a receiving tank and a separating tank, said receiving tank being suitably built together with said separating tank, said separating tank being divided into a liquid pollutant chamber and clean liquid chamber, while said receiving tank being divided into a polluted liquid space and a clean liquid space, said clean liquid space and said polluted liquid space clean liquid space and said polluted liquid space being detached from each other but as communicating vessels being still in connection, likewise said clean liquid chamber and said liquid pollutant chamber being detached from each other but as communicating vessels being still in connection, said clean liquid space, said clean liquid chamber and said liquid pollutant chamber being provided with overflow holes, while said polluted liquid space being provided with an overflow hole and an inflow gate, too—is achieved in that said overflow hole of said polluted liquid space has a self-adjusting weir, the bottom level of said overflow hole of said liquid pollutant chamber is under the lowest level of said self-adjusting weir of said polluted liquid space, the level of said overflow hole of said clean liquid chamber is under the bottom level of said overflow hole of said liquid pollutant chamber, while the level of said overflow hole of said clean liquid space is practically on the lowest level of said self-adjusting weir of said polluted liquid space, said liquid pollutant chamber of said separating tank is adjacent to said polluted liquid space of said receiving tank, and said self-adjusting weir is located along the partition wall between them.

Another characteristic feature of the device according to the invention is that said receiving tank is flanked by said liquid pollutant chamber and said clean liquid chamber of said separating tank, and said clean liquid chamber extends under or beside said receiving tank, too.

According to the invention the device has a canal suitable to conduct said polluted liquid, the united block of said receiving tank and said separating tank is built into said canal itself and divides said canal into two branches, said inflow gate is reduced by deflectors, said deflectors detach said branches from said canal, said receiving tank has two clean liquid spaces that flank said polluted liquid space, said clean liquid spaces are detached from said polluted liquid space by submerging walls practically parallel to the line of flow but are still connected to it by communicating holes, said clean liquid spaces are flanked by said branches, said clean liquid spaces are detached from said branches by longitudinal parting walls practically parallel to the line of flow and by said overflow holes, further said overflow holes of said clean liquid spaces, said overflow hole of said clean liquid chamber and said overflow hole of said liquid pollutant chamber have fix weirs. The device according to the invention has a number of advantages. The most important of these is, that by the device according to the invention the liquid pollutant can be removed from the polluted liquid so, that the result is a fully clean liquid and a pollutant fully free from clean liquid, consequently they do not need a further cleansing.

To the separating tank the polluted liquid flows steadily by means of the device, so the reliability of the operation is independent of the rate of waterflow, that means that it operates perfectly even beside extreme rates of flow. The device is self-controlling, there is no need of human supervision, and in this way all the mistakes that usually come along due to human negligence do not occur here. The operation is not influenced by inflow of floating solid contamination or of often denser pollutant with variable viscosity. When the point of solidification of the pollutant is higher than the outer temperature, the operation can be maintained by heating only the overflow hole of the liquid pollutant chamber, so the operation is energy sparing.

The self-adjusting weir meets the requirements perfectly even if not surrounded by a sealer. There is no need of any machinery or energy controlling device, the operation is still perfect.

The device according to the invention will now be further described in detail by way of example with reference to the accompanying drawings in which FIG. 1 is a schematic cross section of a possible embodiment of the device according to the invention, FIG. 2 is a schematic longitudinal section of another embodiment, FIG. 3 is the top view of the embodiment shown in FIG. 2, FIG. 4 is the cross-section along plane IV—IV shown in FIG. 2.

In FIG. 1 the receiving tank 21 contains the polluted liquid space 1 and the clean liquid space 2, while the separating tank 22 comprises the liquid pollutant chamber 3 and the clean liquid chamber 4. The receiving tank 21 is built together with the separating tank 22 so that the receiving tank 21 is flanked by the liquid pollutant chamber 3 and the clean liquid chamber 4 of the separating tank 22. In FIG. 1 the clean liquid chamber 4 extends under the receiving tank 21, but there is another possible case, not to be seen in FIG. 1, when the clean liquid chamber 4 is beside the receiving tank 21.

The self-adjusting weir 8, which is in the same time the bottom level of the overflow hole 13 of the polluted liquid space 1 is built into the partition wall 15 between the polluted liquid space 1 and the liquid pollutant chamber 3. The clean liquid space 2 is provided with the overflow hole 9, the liquid pollutant chamber 3 is provided with the overflow hole 11, while the clean liquid chamber 4 has the overflow hole 12.

In the embodiment shown in FIG. 1 the overflow hole 9 of the clean liquid space 2 has the weir 9y, the overflow hole 11 of the liquid pollutant chamber 3 has the weir 11y, while the overflow hole 12 of the clean liquid chamber 4 has the weir 12y.

The weir 11y is under the lowest level of the self-adjusting weir 8, the level of the weir 9y is practically on the same height as the lowest level of the self-adjusting weir 8.

The operation of the device is as follows: The flowing polluted liquid of changing quantity flows into the polluted liquid space 1 of the receiving tank 21 through the inflow gate 7. The self-adjusting weir 8 follows the height the water level of the incoming polluted liquid, e.g. oily water, its level is always around the water level, between the two endpositions.

For this reason the oily water that spills over the self-adjusting weir 8 into the liquid pollutant chamber 3 of the separating tank 22 has a steady layer thickness. The polluted liquid space 1 of the receiving tank 21 is detached from the clean liquid space 2 by the submerging wall 5 of the receiving tank 21, under the submerging wall 5 there is a communicating hole 6 through which the polluted liquid space 1 and the clean liquid space 2 are as communicating vessels connected.

In the clean liquid space 2 containing clean water the water level is always at least on the level of the weir 9y, for over this level the water spills through, while under this level the water cannot flow out. The level of the weir 9y is practically equal to the lowest level of the self-adjusting weir 8. The surface of the oily water in the polluted liquid space 1 is higher than the water level in the clean liquid space 2, for the oily water is lighter than the water.

When the level of the clean water reaches the level of the weir 9y, the clean water flow through the overflow hole 9 of the clean liquid space 2, while the oily water in a practically steady quantity spills into the liquid pollutant chamber 3 through the self-adjusting weir 8 of the overflow hole 13 of the polluted liquid space 1.

In the liquid pollutant chamber 3 the liquid pollutant, in our case the oil is floating on the surface, while the water staying below leaves for the clean liquid chamber 4 through the communicating hole 10 of the separating tank 22, and later, reaching the level of the weir 12y spills through the overflow hole 12 of the clean liquid chamber 4.

The oil that is collected on the top in the liquid pollutant chamber 3 spills through the overflow hole 11 of the liquid pollutant chamber 3, because the weir 11y of the latter is located higher than the weir 12y according to the difference between the specific weights of the oil and the water.

Of course for the proper operation the tanks with the spaces and chambers, the sizes of the submerging walls and communicating holes have to be dimensioned in conformity with the extreme rates of flow of the incoming liquid, the viscosity and the specific weight of the pollutant, in a given case, its proportion, further with the sizes of the floating solid pollutants.

A further possible embodiment is shown on FIGS. 2, 3 and 4. In this embodiment the united block of the receiving tank 21 and the separating tank 22 is built into the canal 19 itself, in which the polluted liquid is flowing, e.g. into the by-pass canal.

The polluted liquid is conducted into the polluted liquid space 1 of the receiving tank 21 by the two deflectors 16 flanking the inflow gate 7. The deflectors 16 divide the canal 19 into two branches 20a and 20b at the same time, closing them from the canal 19:

The branches 20a and 20b flank the united block of the receiving tank 21 and the separating tank 22 and flowing downstream they are reunited as canal 19. The polluted liquid space 1 are flanked by the clean liquid spaces 2a and 2b. The polluted liquid space 1 are detached from the clean liquid spaces 2a and 2b by the submerging walls 5a and 5b of the receiving tank 21, but they are at the same time connected as communicating vessels by the communicating holes 6a and 6b of the receiving tank 21.

The clean liquid spaces 2a and 2b are detached from the branches 20a and 20b by the longitudinal parting walls 14a and 14b but the clean liquid spaces 2a and 2b are connected with the branches 20a and 20b by the overflow holes 9a and 9b of the clean liquid spaces 2a and 2b and by the weirs 9y on the bottom level of the latters.

The polluted liquid space 1 is adjacent to the liquid pollutant chamber 3 of the separating tank 22, the self-adjusting weir 8 is built into the partition wall 15 between them, on the bottom level of the overflow hole 13 of the polluted liquid space 1. The liquid pollutant chamber 3 is adjacent to the clean liquid chamber 4, the two of them are detached from each other by the submerging wall 18 of the separating tank 22, but they are in connection as communicating vessels through the communicating hole 10 of the separating tank 22.

The clean liquid chamber 4 is closed by the end wall 17, beyond the end wall 17 there is again the canal 19 that unifies the branches 20a and 20b.

The top edge of the end wall 17 is provided with the weir 12y, this is also the bottom level of the overflow hole 12 of the clean liquid chamber 4. The bottom level of the overflow hole 11 of the liquid pollutant chamber 3 is located higher than the level of the weir 12y. In the canal 19 a liquid with changing quantity, e.g. oily water flows into the polluted liquid space 1 through the inflow gate 7 between the deflectors 16. The extra water containing no oil flows into the clean liquid spaces 2a and 2b through the communicating holes 6a and 6b the receiving tank 21. When the water level in these reaches the level of the weirs 9y, the clean water spills through the weirs 9y into the branches 20a and 20b, and from these it flows again into the canal 19, in the section following the separating tank 22.

The level of the oily water in the polluted liquid space 1 is followed by the self-adjusted weir 8, which separates a steady quantity from that. The oily water gets this way into the liquid pollutant chamber 3. Here the supernatant oil leaves through the overflow hole 11, while the chelan water staying under gets into the clean liquid chamber 4 through the communicating hole 10 of the separating tank 22 under the submerging wall 18 of the separating tank 22.

The clean water in the clean liquid chamber 4, if its level reaches the level of the weir 12y which is in the end wall 17 spills into the canal 19 unifying the branches 20a and 20b and there it is mixed to the clean water coming from the clean liquid space 2.

It is to be noted at this embodiment that the so-called dwelling period needed for the pollutant to become supernatant can be determined from the dimensions of the canal 19 and the built-in polluted liquid space 1 together. If there is an extremely great inflow the pollutant is held in the canal 19 in front of the receiving tank 21 so far the thickness of the pollutant layer reaches the upper level of the communicating holes 6a and 6b. Consequently the retaining ability of the device can be optimally increased with the length of the incoming section of the canal 19.

The device according to the invention can be employed independently as oil or fat catcher, or to remove any other supernatant liquid pollutant either independently or jointed to any existing equipment for making their operation perfect. The device can be combined with any similar device with the same purpose but imperfect operation.

It can be either a stationary or a mobile device. Its employment is especially advantageous on sites where the rate of flow is often changing or there is a pollutant of changing quality and changing proportion.

As the device separates the liquid pollutant free from water, it is especially useful when the liquid tank is of limited capacity, for instance at unexpected oil-spillages either on rivers or on the open sea.

I claim:

1. A device for separating supernatant liquid pollutant from liquid, comprising a receiving tank and a separating tank with said receiving tank formed as an integrated structure together with said separating tank, said separating tank having a liquid pollutant chamber and a clean liquid chamber in communication with one another, wall means for dividing said receiving tank into a first vessel defining a polluted liquid space and a second vessel defining a clean liquid space, access means to permit said first vessel to communicate with said second vessel through said wall means, said first vessel having inflow means and first overflow means, said second vessel having second overflow means and said liquid pollutant chamber having a first overflow hole, said clean liquid chamber having a second overflow hole wherein said first overflow means comprises a self adjusting weir with said first overflow hole comprising a weir located at a level below a lowest level of said self-adjusting weir and with said second overflow hole comprising a weir disposed under the level of said first overflow hole with said second overflow means being located at a level corresponding to the lowest level of the self-adjusting weir and further comprising a partition wall located between said first vessel of said receiving tank and the liquid pollutant chamber of said separating tank with said self-adjusting weir located along said partition wall.

2. A device according to claim 1, wherein said receiving tank nests within said separating tank with said liquid pollutant chamber and said clean liquid chamber of said separating tank being on opposite sides of said receiving tank.

3. A device according to claim 1 further comprising a canal for discharging said polluted liquid, with said canal having two branches, an inflow gate connecting said canal to said receiving tank having two clean liquid spaces that flank said polluted liquid space with said two clean liquid spaces being detached from said polluted liquid space, communicating holes for connecting said polluted liquid space to said clean liquid spaces, two longitudinal parting walls lying substantially parallel to a line of flow for separating said branches on opposite sides of said clean liquid spaces with second overflow means for each of said clean liquid spaces causing a spilling of clean liquid into the two branches from opposite sides.

4. Apparatus for separating a supernatant liquid material from a co-mingled mixture of liquids comprising a receiving tank and a separating tank, wall means for dividing said receiving tank into a first vessel and a second vessel, access means in said wall means for providing a passage between said first vessel and said second vessel, said first vessel having means for receiving the co-mingled liquid mixture and having overflow means comprising a self-adjusting weir, said separating tank having a first receptacle and a second receptacle, wall means separating said first and second receptacles, and access means connecting said first and second receptacles, wherein said first receptacle, includes a discharge outlet for draining supernatant liquid material, with said first vessel located adjacent to said first receptacle, and partition means located between said first vessel and said first receptacle and with said self-adjusting weir located along said partition means.

5. An apparatus according to claim 4, wherein said second vessel has an outlet at a level corresponding to the lowest level of said self-adjusting weir.

6. An apparatus according to claim 4, wherein the supernatant liquid material discharge outlet of said first receptacle is located below the lowest level of said self-adjusting weir.

7. An apparatus according to claim 4, wherein said second receptacle has an outlet which is at a level lower than a level of the discharge outlet of the first receptacle.

* * * * *